(12) United States Patent
Goyal et al.

(10) Patent No.: US 12,474,899 B2
(45) Date of Patent: Nov. 18, 2025

(54) METHOD AND ELECTRONIC DEVICE FOR RETRIEVING OUTPUT ON FORM FIELDS FROM USER INTERFACE

(71) Applicant: Rakuten Symphony, Inc., Tokyo (JP)

(72) Inventors: Mukul Goyal, Indore (IN); Shubha Thakur, Indore (IN); Shubham Vishvakarma, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/012,028

(22) PCT Filed: Sep. 27, 2022

(86) PCT No.: PCT/US2022/044801
§ 371 (c)(1),
(2) Date: Dec. 21, 2022

(87) PCT Pub. No.: WO2024/010602
PCT Pub. Date: Jan. 11, 2024

(65) Prior Publication Data
US 2024/0231772 A1 Jul. 11, 2024

(30) Foreign Application Priority Data
Jul. 8, 2022 (IN) .............................. 202241039430

(51) Int. Cl.
*G06F 9/44* (2018.01)
*G06F 8/34* (2018.01)
*G06F 8/38* (2018.01)

(52) U.S. Cl.
CPC . *G06F 8/38* (2013.01); *G06F 8/34* (2013.01)

(58) Field of Classification Search
CPC ....................................................... G06F 8/38
(Continued)

(56) References Cited

U.S. PATENT DOCUMENTS

| 6,910,179 B1 * | 6/2005 | Pennell ............... G06Q 20/108 705/26.8 |
| 10,728,340 B2 * | 7/2020 | Thummalapalli ... H04L 41/0895 |

(Continued)

OTHER PUBLICATIONS

International Search Report dated Jan. 20, 2023 from the International Searching Authority in International Application No. PCT/US2022/044801.

(Continued)

*Primary Examiner* — Evral E Bodden
(74) *Attorney, Agent, or Firm* — Sughrue Mion, PLLC

(57) ABSTRACT

Embodiment herein provides a method for graphically configuring an application programming interface (API) on form field to retrieve desired output from user interface (UI) by an electronic device. The method includes displaying, by the electronic device, the UI including form fields to configure the API on the form fields and configuring, by the electronic device, the API to the form field by inputting building blocks using a graphical configuration field. The method includes mapping, by the electronic device, the form field to dependent form field based on the configured API and receiving, by the electronic device, attributes in the form field; determining, by the electronic device, attributes corresponding to the dependent form field by applying the API with the attributes received in the form field; automatically filling the dependent form fields based on the determined attributes corresponding to the dependent form fields and displaying the filled dependent form fields.

8 Claims, 8 Drawing Sheets

(58) Field of Classification Search
USPC .......................................................... 717/109
See application file for complete search history.

(56)  References Cited

U.S. PATENT DOCUMENTS

| | | | | |
|---|---|---|---|---|
| 2006/0179404 | A1* | 8/2006 | Yolleck | G06F 40/174 |
| | | | | 715/272 |
| 2012/0324432 | A1* | 12/2012 | Mizrachi | G06F 8/30 |
| | | | | 717/162 |
| 2017/0102925 | A1* | 4/2017 | Ali | G06F 8/30 |
| 2019/0068703 | A1* | 2/2019 | Vora | H04L 67/34 |
| 2020/0089524 | A1* | 3/2020 | Nelson | H04L 67/1097 |

OTHER PUBLICATIONS

Written Opinion dated Jan. 20, 2023 from the International Searching Authority in International Application No. PCT/US2022/044801.

* cited by examiner

FIG. 3A

METHOD AND ELECTRONIC DEVICE FOR RETRIEVING OUTPUT ON FORM FIELDS FROM USER INTERFACE

This Application is a National Stage of International Application No. PCT/US2022/044801 filed Sep. 27, 2022, claiming priority based on Indian Patent Application No. 202241039430 filed Jul. 8, 2022.

FIELD OF INVENTION

The present invention relates to management of forms by an electronic device and more specifically related to a method and the electronic device for retrieving an output on form fields directly from a user interface (UI) of the electronic device.

BACKGROUND

In general, web-based forms are used to receive information such as health related information, employment related information, user feedback after availing specific service or using a specific product, etc. from users for various purposes. However, in many scenarios the information to be provided in form fields may be related to each other and hence related form fields can be mapped to automatically fetch results. For example, a first form field may be related to a citizen identity (ID) card number and a second form field may be related to a user location which may be automatically determined based on the citizen ID card number.

Conventional methods and systems require development of code by a team of skilled developers when the related form fields need to be mapped to automatically fetch the results. Further, the developed code needs to be deployed before a user can automatically fetch results into related fields while providing inputs into one or more form fields. The process of development and deployment of solutions is a costly, time consuming and cumbersome process. Further, the process of development and deployment of the solutions needs to be performed by technically sound developers who are well-versed in specific coding languages used for the development and cannot be performed by an admin user. As a result, when there is an on the fly request to make some changes into the form fields, the same cannot be met immediately. Thus, it is desired to address the aforementioned disadvantages or other shortcomings or at least provide a useful alternative.

OBJECT OF INVENTION

The principal object of the embodiments herein is to provide a method and an electronic device for retrieving an output on form fields directly from a user interface (UI) of the electronic device without development and deployment of any code. The output is directly retrieved from the UI by configuring an application program interface (API) to at least one form field to fetch attributes corresponding to dependent form fields based on an execution of the API. Therefore, the proposed method eliminates the requirement of development and deployment of the code every single time for mapping form fields, thereby saving time and reducing complexity of the process.

SUMMARY

Accordingly, the embodiment herein is to provide a method for graphically configuring application program interface (API) on form field to retrieve desired output from user interface (UI) by an electronic device. The method includes displaying, by the electronic device, the UI including a plurality of form fields to enable a user to configure the API on the plurality of form fields at the UI and configuring, by the electronic device, the API to the form field of the plurality of form fields by inputting a plurality of building blocks using a graphical configuration field. The method also includes mapping, by the electronic device, the form field to dependent form field of plurality of dependent form fields based on the configured API and receiving, by the electronic device, attributes in the form field. The method also includes determining, by the electronic device, attributes corresponding to the dependent form field of the plurality of dependent form fields by applying the API configured to the form field based on the attributes received in the form field; automatically filling, by the electronic device, the plurality of dependent form fields based on the determined attributes corresponding to the plurality of dependent form fields: and displaying, by the electronic device, the plurality of filled dependent form fields.

In an embodiment, determining, by the electronic device, the attributes corresponding to the plurality of dependent form fields by applying the API configured to the form field based on the attributes received in the form field includes invoking, by the electronic device, the API configured to the form field; executing, by the electronic device, the API configured to the form field based on the attributes received in the form field: and determining, by the electronic device, the attributes corresponding to the plurality of dependent form fields based on the execution of the API.

In an embodiment, configuring, by the electronic device, the API to the form field of the plurality of form fields by inputting the plurality of building blocks using the graphical API configuration field includes enabling, by the electronic device, an API configuration option of the at least one form field to which the API is configured and receiving, by the electronic device, the plurality of building blocks associated with the at least one API to be configured to the at least one form field. Further, the method includes creating, by the electronic device, the at least one API configuration based on the plurality of received building blocks: and configuring, by the electronic device, the at least one created API to the at least one form field of the plurality of form fields.

In an embodiment, the method further includes storing, by the electronic device, the at least one created API comprising the plurality of building blocks associated with the API in a specific format in a memory of the electronic device.

In an embodiment, the plurality of building blocks associated with the API comprises a request type of the API, a type of the API, an area of operation of the API, an API response key and information related to an API source.

Accordingly, the embodiments herein provide an electronic device for graphically configuring at least one application program interface (API) on form field to retrieve desired output from user interface (UI). The electronic device includes a memory, a processor, a communicator and an API management controller. The API management controller is configured to display the UI including a plurality of form fields to enable a user to configure the API on the plurality of form fields at the UI and configure the API to the form field of the plurality of form fields by inputting a plurality of building blocks using a graphical configuration field. The API management controller is configured to map the form field to dependent form field of plurality of dependent form fields based on the configured API; receive attributes in the form field and determine attributes corresponding to the dependent form field of the plurality of dependent form fields by applying the API configured to the form field based on the attributes received in the form field. The API management controller is also configured to automatically fill the plurality of dependent form fields based on the determined attributes corresponding to the plurality of dependent form fields; and display the plurality of filled dependent form fields.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which:

FIG. 3A is an example illustrating a scenario of editing the form field to enable a configuration mode of the form field to configure the API, according to an embodiment as disclosed herein:

DETAILED DESCRIPTION OF INVENTION

Figure 1:
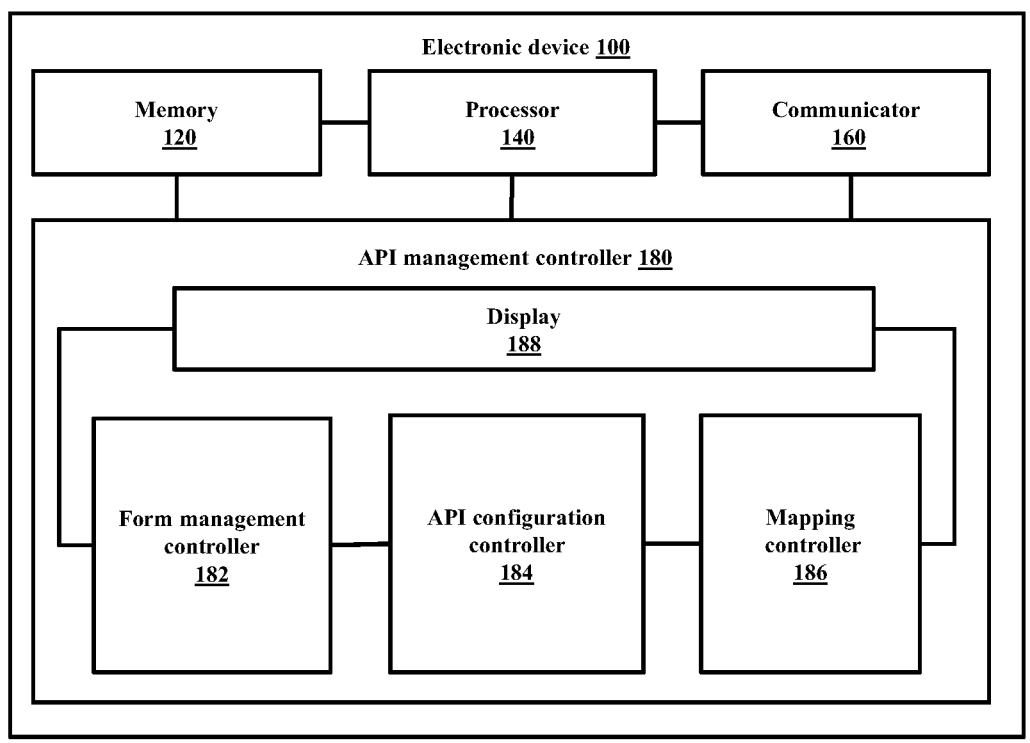
FIG. 1 is a block diagram of an electronic device for retrieving an output directly on form fields by configuring an API, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits, and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiment herein is to provide a method for graphically configuring application program interface (API) on form field to retrieve desired output from user interface (UI) by an electronic device. The method includes displaying, by the electronic device, the UI including a plurality of form fields to enable a user to configure the API on the plurality of form fields at the UI and configuring, by the electronic device, the API to the form field of the plurality of form fields by inputting a plurality of building blocks using a graphical configuration field. The method also includes mapping, by the electronic device, the form field to dependent form field of plurality of dependent form fields based on the configured API and receiving, by the electronic device, attributes in the form field. The method also includes determining, by the electronic device, attributes corresponding to the dependent form field of the plurality of dependent form fields by applying the API configured to the form field based on the attributes received in the form field; automatically filling, by the electronic device, the plurality of dependent form fields based on the determined attributes corresponding to the plurality of dependent form fields; and displaying, by the electronic device, the plurality of filled dependent form fields.

Accordingly, the embodiments herein provide an electronic device for graphically configuring at least one application program interface (API) on form field to retrieve desired output from user interface (UI). The electronic device includes a memory, a processor, a communicator and an API management controller. The API management controller is configured to display the UI including a plurality of form fields to enable a user to configure the API on the plurality of form fields at the UI and configure the API to the form field of the plurality of form fields by inputting a plurality of building blocks using a graphical configuration field. The API management controller is configured to map the form field to dependent form field of plurality of dependent form fields based on the configured API; receive attributes in the form field and determine attributes corresponding to the dependent form field of the plurality of dependent form fields by applying the API configured to the form field based on the attributes received in the form field. The API management controller is also configured to automatically fill the plurality of dependent form fields based on the determined attributes corresponding to the plurality of dependent form fields; and display the plurality of filled dependent form fields.

The conventional methods and systems require the user to write hardcode or custom APIs to be able fetch any form field data based on some criteria (for example, query). As a result, the process becomes highly technical requiring a custom API and also requires developer's help to complete the task which makes the process time consuming and cumbersome for an admin user.

Unlike to the conventional methods and systems, the proposed method provides a user friendly UI to ease the configuration and the execution of the API. As a result, the proposed method saves time and accelerates the process of fetching the data to fill the form fields.

In the conventional methods and systems, there is no option available to create relationships between the form parameters from the UI and hence adding relationships on the form fields requires development and deployment efforts which increase cost of the process and also is a time-consuming process. Further, the development effort required may lead towards complete deployment process to avail the changes for end users.

Unlike the conventional methods and system, the proposed method provides the user friendly UI to ease configuration and execution of the forms. Here the admin user can configure the relationships between the form fields from the UI itself. As a result, the proposed method does not require any technical expertise to configure the API into the form field, when the API is readily available with the admin user. As a result, the proposed method is cost effective since no development is required. Further, the proposed method also saves the time and accelerates floor drawing process.

Unlike the conventional methods and system, the proposed method intelligently determines if the API configured to the form field where the specific form field is used repetitively, and executes the same to automatically populate content in the dependent/related form field.

Referring now to the drawings and more particularly to FIGS. 1 through 3D, where similar reference characters denote corresponding features consistently throughout the figures, there are shown preferred embodiments.

FIG. 1 is a block diagram of an electronic device (100) for retrieving an output directly on form fields by configuring an API, according to an embodiment as disclosed herein. The electronic device (100) can be for example but is not limited to a laptop, a palmtop, a desktop, a mobile phone, a smartphone, Personal Digital Assistant (PDA), a tablet, a wearable device, an Internet of Things (IOT) device, a virtual reality device, a foldable device, a flexible device, a display device, an immersive system and a server device.

In an embodiment, the electronic device (100) includes a memory (120), a processor (140), a communicator (160) and an API management controller (180).

The memory (120) is configured to store the API which is created and configured to a specific form field which is executed to fetch data for a dependent form field. Further, the memory (120) also stores instructions to be executed by the processor (140). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information. In certain examples, a non-transitory storage medium may store data that can, over time, change (e.g., in Random Access Memory (RAM) or cache).

The processor (140) communicates with the memory (120), the communicator (160), and the API management controller (180). The processor (140) is configured to execute instructions stored in the memory (120) and to perform various processes. The processor (140) may include one or a plurality of processors, may be a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (160) includes an electronic circuit specific to a standard that enables wired or wireless communication. The communicator (160) is configured to communicate internally between internal hardware components of the electronic device (100) and with external devices via one or more networks.

In an embodiment, the API management controller (180) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors. The API management controller (180) includes a form management controller (182), an API configuration controller (184) and a mapping controller (186) and a display (188).

In an embodiment, the form management controller (182) causes to display of a UI of a web form which includes multiple form fields. The form can be for example, an employee data form comprising multiple form fields like an employee name, an employee gender, an employee date of joining, an employee date of birth, etc. A user can configure the API on any of the multiple form fields at the UI only without requiring development and deployment of specific and high-end codes. The form field may include a graphical API configuration field where the API can be provided directly by the user.

In an embodiment, the API configuration controller (184) is configured to determine the form field for configuring the API and the multiple dependent form fields corresponding to that form field. Here, the form field for configuring the API can be selected manually by the user or automatically selected based on user preference along with the multiple dependent form fields corresponding to that form field. The API configuration controller (184) is configured to receive the API to the form field of the plurality of form fields by inputting the plurality of building blocks using a graphical configuration field. The graphical configuration field is an editing option which enables configuring of the API into the form fields along with the building blocks associated with the API. The building blocks associated with the API determines the characteristics of the API which is configured into the form field. The plurality of building blocks associated with the API may include but is not limited to a request type of the API (for example, GET request or POST request), a type of the API (for example, API is provided on the UI or at backend), an area of operation of the API (for example, internal or external), an API response key (for example, name of dependent form field which is to be mapped with the form field where the API is configured) and information related to an API source. For example, if a view builder form contains two form fields such as 'View ID' and 'View Name' and the user wants to add a relationship between the two form fields that on the input of the form field 'view ID', the form field 'view name' should auto populate. This can be achieved by configuring the appropriate API which is available with the user.

The configuration of the API to the form field by inputting the plurality of building blocks using the graphical configuration field includes enabling an API configuration option of the form field to which the API is to be configured and receiving the plurality of received building blocks associated with the API to be configured to the form field. Further, the API configuration controller (184) is configured to create the API configuration based on the plurality of building blocks associated with the API and configure the created API to the form field. The created API is then stored in the memory (120) in the specific format.

In an embodiment, the mapping controller (186) is configured to map the form field to the dependent form field based on the configured API to determine attributes of the dependent form field. Further, the mapping controller (186) is configured to receive attributes in the form field where the API is configured and determine attributes corresponding to the dependent form fields by applying the API configured to the form field based on the attributes received in the form field and based on the mapping. The attributes corresponding to the dependent form fields is determined by invoking the API configured to the form field and executing the API configured to the form field based on the attributes received in the form field. The attributes in the form field is for example a Site identifier (ID) for an antenna system in FIG. 3C; a name of an employee, a date of birth of the employee, an employee ID, etc. in an employment related form. Further, the mapping controller (186) is configured to automatically fill the dependent form fields with the determined attributes corresponding to the dependent form fields and cause to display the filled dependent form fields.

At least one of the plurality of modules/components of the API management controller (180) may be implemented through an AI model. A function associated with the AI model may be performed through memory (120) and the processor (140). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

In an embodiment, the display (188) is configured to display the UI of an application which provides the forms. The form includes multiple form fields. Each of the form fields includes options for the user to be able to provide inputs, edit the form fields, delete the form fields, get information regarding the form fields and configure various building blocks into the form fields, etc. The display (188) is also configured to automatically display the mapped responses in dependent form fields of the forms based on the user inputs and the configured API. The display (188) can receive inputs, and is made of one of liquid crystal display (LCD), light emitting diode (LED), organic light-emitting diode (OLED), etc. The user inputs may be provided as for example but not limited to touch, swipe, drag, gesture, voice command, etc.

Although the FIG. 1 shows various hardware components of the electronic device (100), but it is to be understood that other embodiments are not limited thereon. In other embodiments, the electronic device (100) may include less or a greater number of components. Further, the labels or names of the components are used only for illustrative purpose and does not limit the scope of the invention. One or more components can be combined to perform same or substantially similar function to graphically configure the API on the form field to retrieve the desired output from the UI.

Figure 2A:
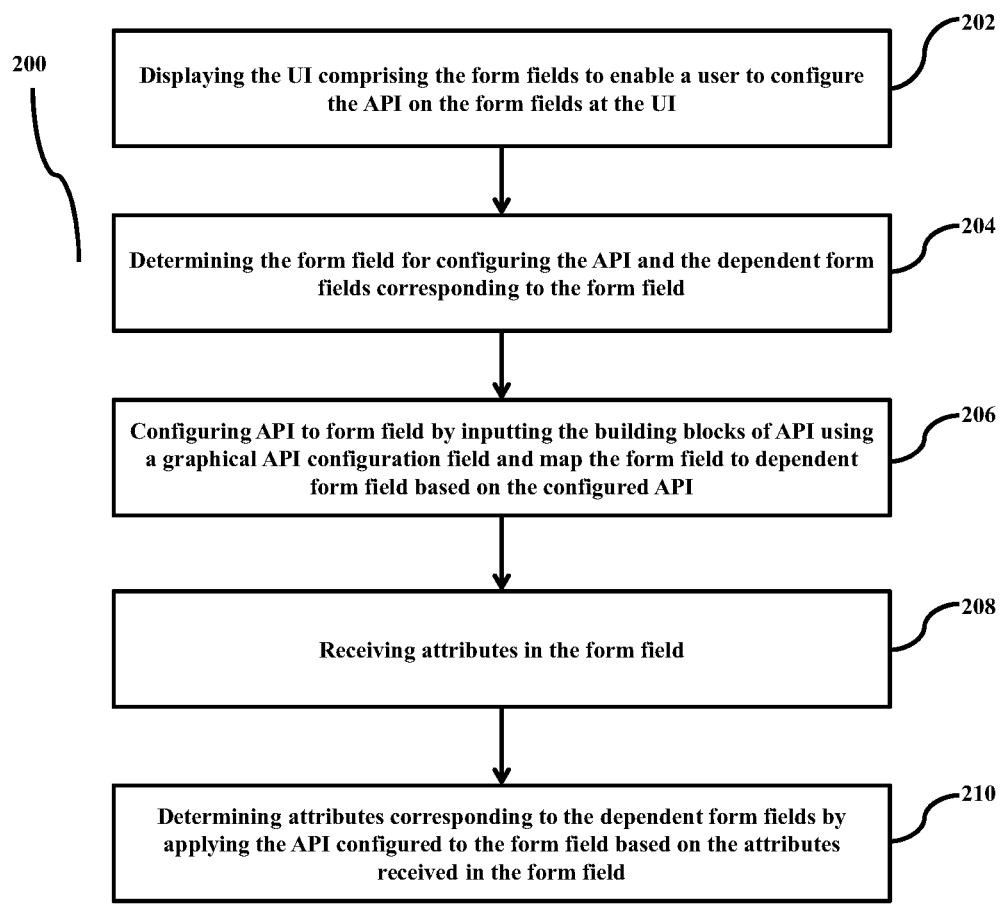
FIG. 2A is a flow chart illustrating a method for graphically configuring the API on the form field to retrieve the desired output by the electronic device, according to an embodiment as disclosed herein.

FIG. 2A is a flow chart (200) illustrating a method for graphically configuring the API on the form field to retrieve the desired output by the electronic device (100), according to an embodiment as disclosed herein.

Referring to the FIG. 2A, at step 202, the method includes the electronic device (100) displaying the UI which includes the multiple form fields to enable the user to configure the API on the multiple form fields at the UI only. For example, in the electronic device (100) as illustrated in the FIG. 1, the API management controller (180) is configured to display the UI which includes multiple form fields to enable the user to configure the API on the multiple form fields at the UI only.

At step 204, the method includes the electronic device (100) determining the form field for configuring the API and the multiple dependent form fields corresponding to the form field. For example, in the electronic device (100) as illustrated in the FIG. 1, the API management controller (180) is configured to determine the form field for configuring the API, and the multiple dependent form fields corresponding to the form field.

At step 206, the method includes the electronic device (100) configuring the API to the form field by inputting the plurality of API characteristic using the graphical API configuration field and mapping the form field to dependent form field based on the configured API. For example, in the electronic device (100) as illustrated in the FIG. 1, the API management controller (180) is configured to configure the API to the form field by inputting the plurality of API characteristic using the graphical API configuration field and map the form field to dependent form field based on the configured API.

At step 208, the method includes the electronic device (100) receiving the attributes in the form field. For example, in the electronic device (100) as illustrated in the FIG. 1, the API management controller (180) is configured to receive the attributes in the form field.

At step 210, the method includes the electronic device (100) determining the attributes corresponding to the dependent form fields by applying the API configured to the form field based on the attributes received in the form field. For example, in the electronic device (100) as illustrated in the FIG. 1, the API management controller (180) is configured to determine the attributes corresponding to the plurality of dependent form fields by applying the API configured to the form field based on the attributes received in the form field.

The various actions, acts, blocks, steps, or the like in the flow diagram (200) may be performed in the order presented, in a different order or simultaneously. Further, in some embodiments, some of the actions, acts, blocks, steps, or the like may be omitted, added, modified, skipped, or the like without departing from the scope of the invention.

Figure 2B:
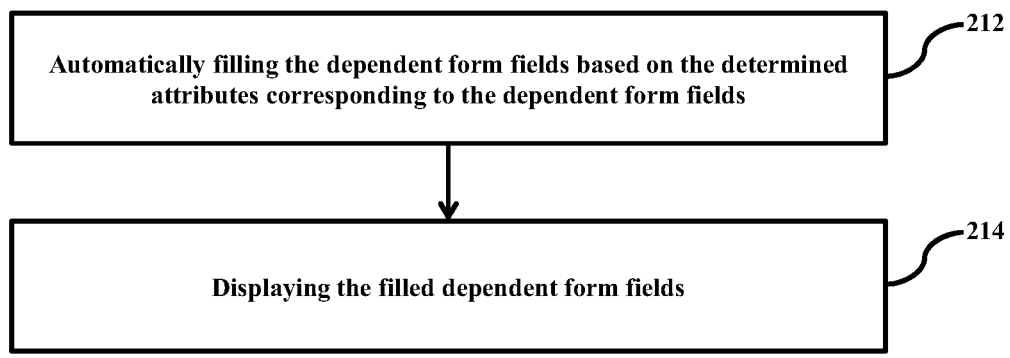
FIG. 2B is a flow chart illustrating a method for executing the configured API on the form field to retrieve the desired output by the electronic device, according to an embodiment as disclosed herein.

FIG. 2B is a flow chart illustrating a method for executing the configured API on the form field to retrieve the desired output by the electronic device, according to an embodiment as disclosed herein.

Referring to the FIG. 2B, at step 212, the method includes the electronic device (100) automatically filling the dependent form fields based on the determined attributes corresponding to the dependent form fields. For example, in the electronic device (100) as illustrated in the FIG. 1, the API management controller (180) is configured to automatically fill the dependent form fields based on the determined attributes corresponding to the dependent form fields.

At step 214, the method includes the electronic device (100) displaying the filled dependent form fields. For example, in the electronic device (100) as illustrated in the FIG. 1, the API management controller (180) is configured to display the filled dependent form fields.

Figure 3A:
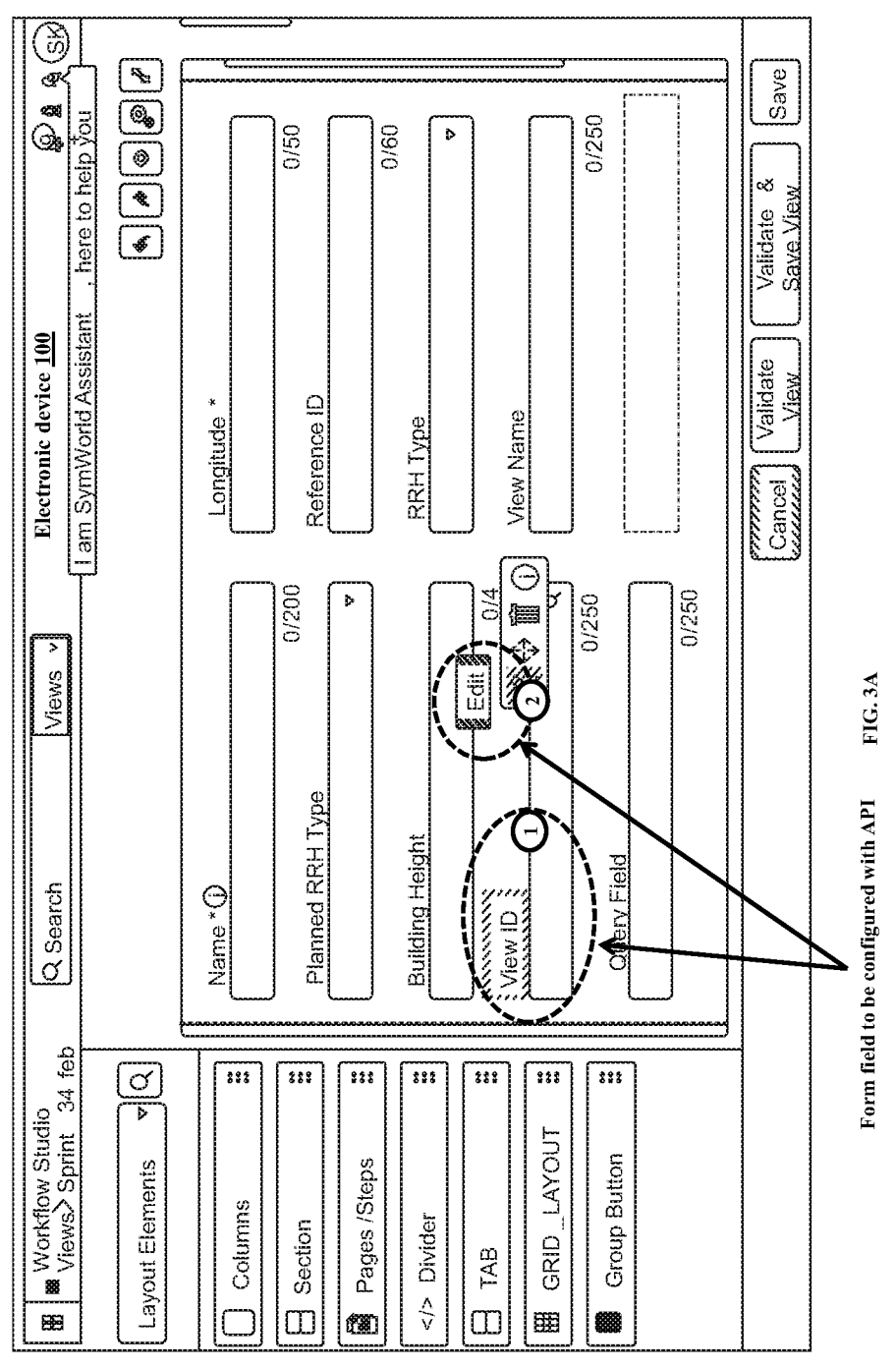

FIG. 3A is an example illustrating a scenario of editing the form field to enable the configuration mode of the form field to configure the API, according to an embodiment as disclosed herein. The proposed method allows an admin end-user of the electronic device (100) to apply relationships between two form fields by configuring the API into one form field and dynamically fetch data of the other form field. This may be done using for example but not limited to, view builder API configuration and the feature is available for the end user to use without any development and deployment at the form end. Therefore, the proposed method eases the process of fetching data into form fields by configuring the API into the form fields.

The API configuration is a feature which is available in the view builder which facilitates the UI of the form where the user can configure the API on at least one form field to fetch the data into any other form fields available in the form. The user can configure static values or view parameters as an input to the API based on the API type and the input data. The user has to provide the building blocks of the API which returns data in the JSON format. If the user wants to update any form field based on the API response then the response JSON can be mapped and the dependent form fields viewed in order to define the relationship. This configuration details are stored in View JSON of the created view. The same JSON information is used to call the API and update the mapped dependent form fields.

Referring to the FIG. 3A, in an example consider that the admin wants to fetch View Name based on View ID. At step 1, the electronic device (100) displays the UI comprising multiple form fields which includes the View ID. At step 2, the user (admin) selects "edit option" associated the View ID field of the form in order to get into the configuration mode which enables the user to configure the API on the multiple form fields at the UI only. However, in this case it must be noted that the API should be available by an application owner for the form fields which are to be related based on the desired relationships.

The proposed method helps users to add relationships between form fields by using API configuration in order to get the desired output. The user can configure the API and define relationship of API response with form fields. For example if a view builder form contains two parameter: the View ID, the View Name, and user want to add a relationship that on input of the view ID, the view name will auto populate which is explained with respect to further figures.

Figure 3B:
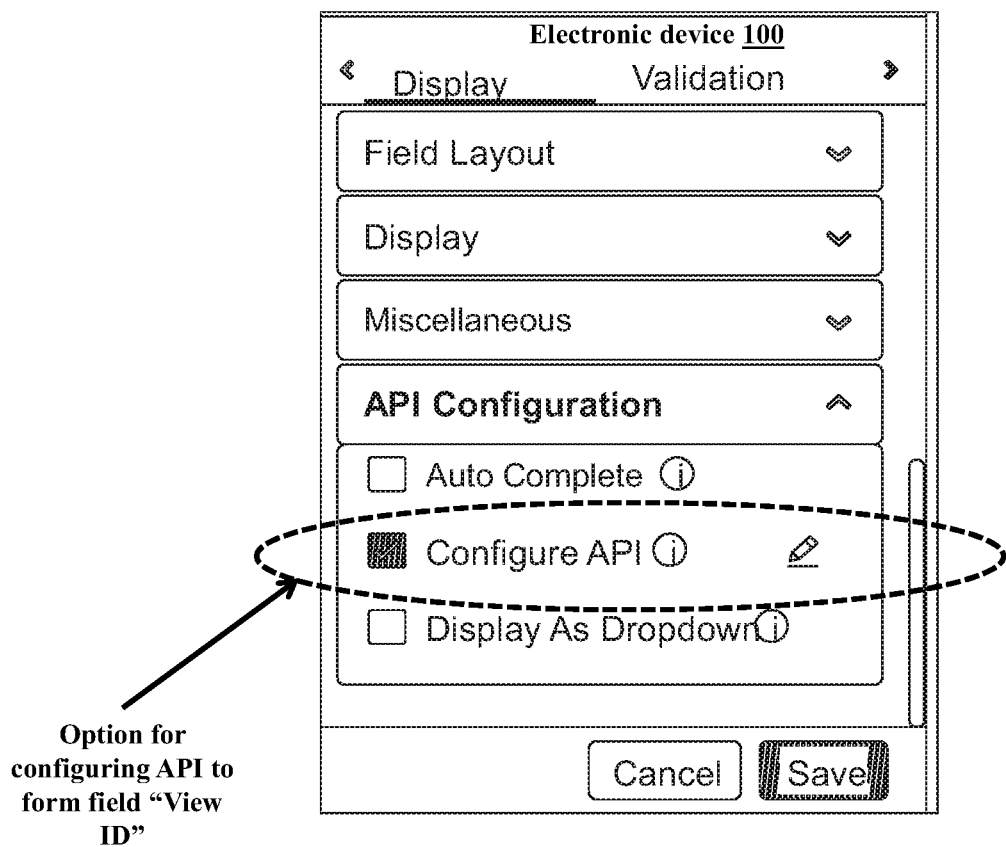
FIG. 3B is an example illustrating a scenario of configuring the API on the form field by the electronic device, according to an embodiment as disclosed herein.

FIG. 3B is an example illustrating a scenario of configuring the API on the form field by the electronic device (100), according to an embodiment as disclosed herein. Referring to the FIG. 3B, in the configuration mode the electronic device (100) allows the user to navigate to "API Configuration section" and select "Configure API" option. The user clicks on edit econ to enter the building blocks of the API.

Figure 3C:
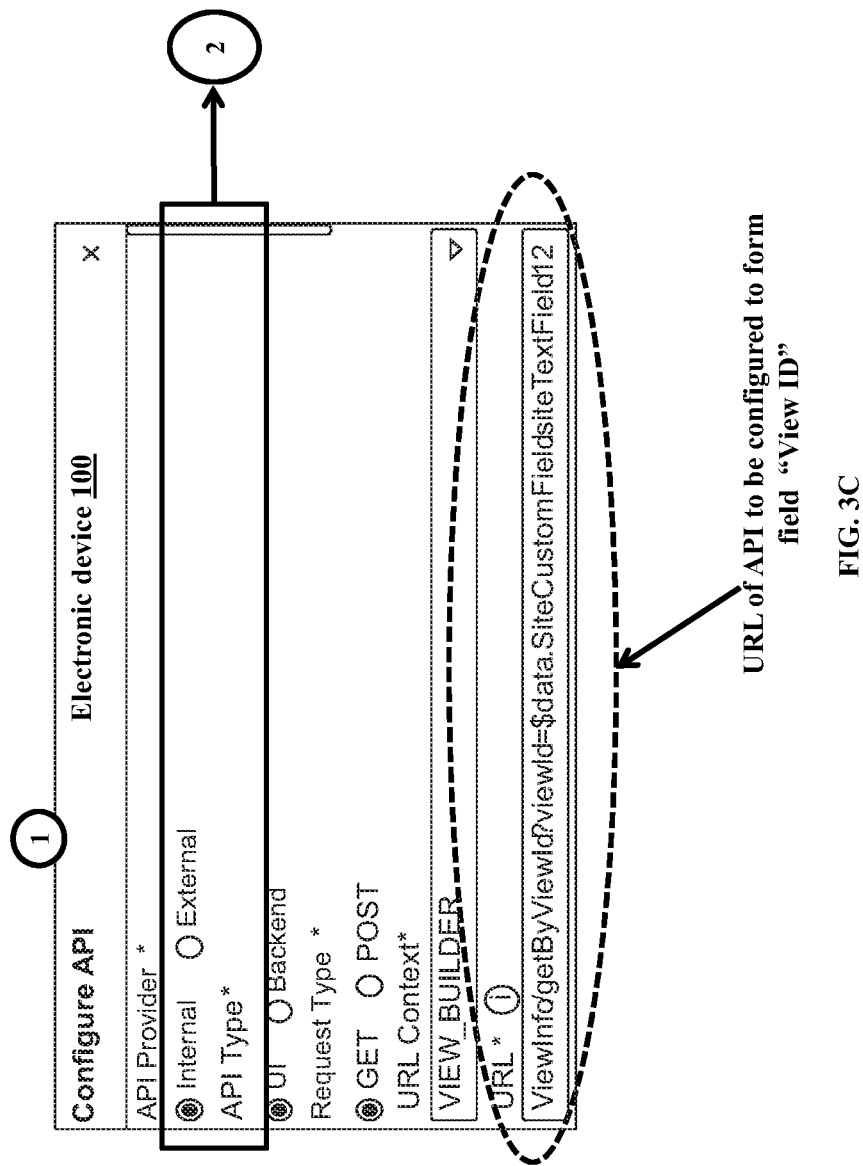
FIG. 3C is an example illustrating a scenario of mapping the form field and corresponding dependent form field based on the configured API, according to an embodiment as disclosed herein.
Figure 3C:
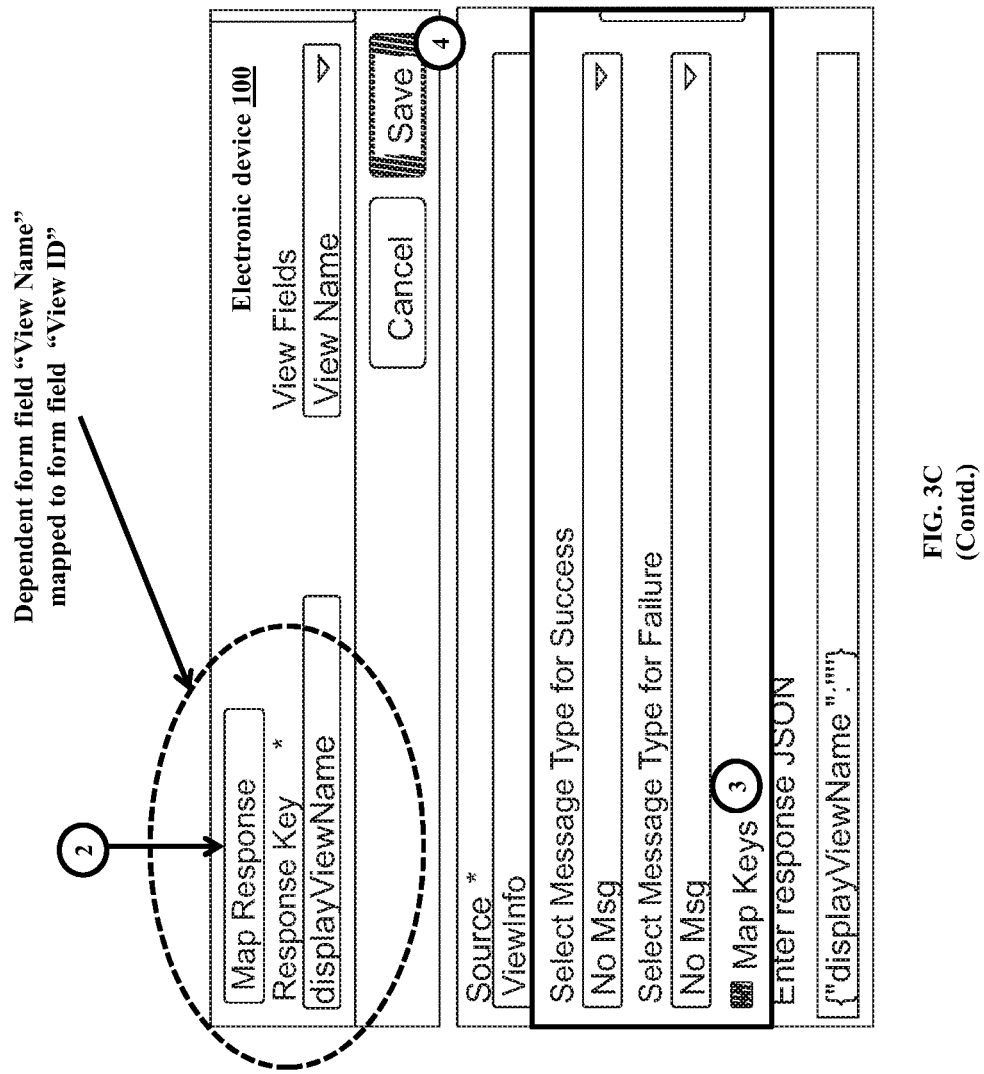

FIG. 3C is an example illustrating a scenario of mapping the form field and the corresponding dependent form field based on the configured API, according to an embodiment as disclosed herein. Referring to the FIG. 3C, in conjunction with the FIG. 3B, at step 1, the electronic device (100) then allows the user to provide the building blocks of the API such as select the type of the API provider as internal or external; select the API type as UI based API or backend API, provide the request type such as GET or POST, select application in the Uniform Resource Locator (URL) context dropdown menu as View Builder and also enter the API in URL section and map response to the dependent form field by providing the response key as "displayViewName". At step 2, the response of the form field View ID is mapped with the form field View Name. Further, at step 3, the map keys option is selected and at step 4 the API configuration details are saved.

Figure 3D:
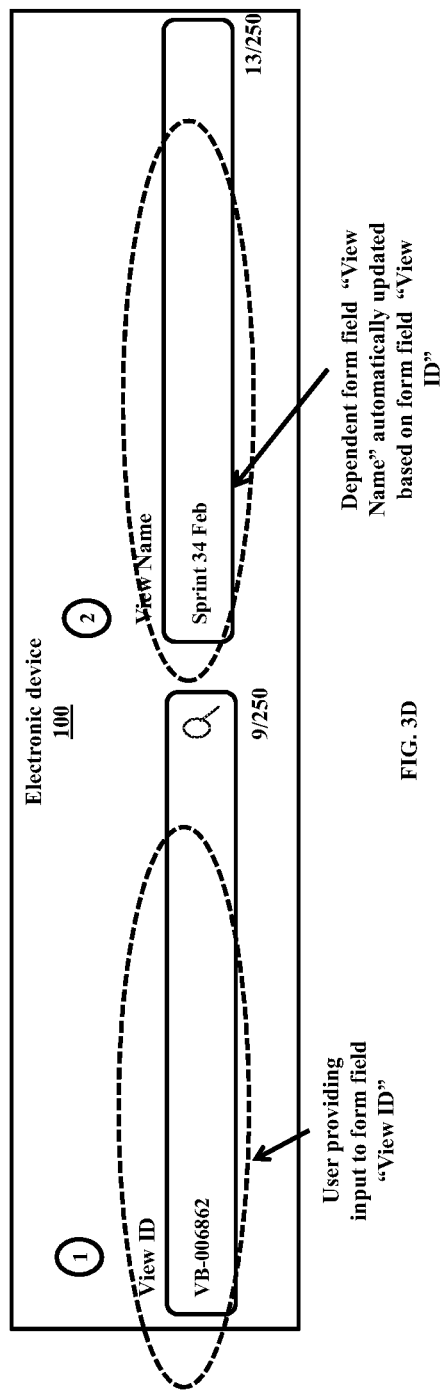
FIG. 3D is an example illustrating a scenario of providing the desired output in the dependent form field based on the configured API, according to an embodiment as disclosed herein.

FIG. 3D is an example illustrating a scenario of providing the desired output in the dependent form field based on the configured API, according to an embodiment as disclosed herein. Referring to the FIG. 3D in conjunction with the FIG. 3A, consider the form displayed in the FIG. 3A, and at step 1 the user provides the input as "VB-006862" in the form field View ID of the form at the time of execution. At the time of view execution if any parameter includes the API configured then the API is called. The API then takes the required input from the view data configured and returns the fetched data. Based on the response mapping configuration the data in the dependent form field gets updated on the UI.

Similarly, at step 2, the view name corresponding to the input View ID "VB-006862" is automatically populated in the form field View Name of the form as "Sprint 34 Feb". Therefore, the electronic device (100) automatically fetches the response to the dependent form fields based on the input provided to any form field where the API is configured for defining the relationship between the two form fields. Therefore, in a scenario where the admin user is in possession of the API which can be used to map any two form fields then there may not be any requirement of the developer to draft a code to fetch the form field data which makes the process of deployment of the process less cumbersome and saves time.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A method for graphically configuring at least one application program interface (API) on form field to retrieve desired output from user interface (UI) by an electronic device, wherein the method comprises:
   displaying, by the electronic device, the UI comprising a plurality of form fields to enable a user to configure the at least one API on the plurality of form fields at the UI, the plurality of form fields being fields through which information is respectively provided as attributes on a form;
   configuring, by the electronic device, the at least one API to at least one form field of the plurality of form fields by inputting a plurality of building blocks using a graphical configuration field, wherein the at least one API being executable according to the configuring to automatically fetch and input a second attribute to a dependent form field based on a user inputted first attribute to the form field;
   mapping, by the electronic device, the at least one form field to at least one dependent form field of plurality of dependent form fields based on the configured at least one API;
   receiving, by the electronic device, a user input of the first attribute in the at least one form field;
   determining, by the electronic device, the second attribute corresponding to the at least one dependent form field of the plurality of dependent form fields by applying the at least one API configured to the at least one form field based on the user inputted first attribute received in the at least one form field;
   automatically filling, by the electronic device, the at least one dependent form field based on the determined second attribute corresponding to the at least one dependent form field; and
   displaying, by the electronic device, the at least one filled dependent form field,
   wherein configuring, by the electronic device, the at least one API to the at least one form field of the plurality of form fields by inputting the plurality of building blocks using the graphical configuration field comprises:
   enabling, by the electronic device, an API configuration option of the at least one form field to which the at least one API is configured;
   receiving, by the electronic device, user inputs of the plurality of building blocks associated with the at least one API to be configured to the at least one form field;
   creating, by the electronic device, the at least one API based on the plurality of building blocks associated with the at least one API; and
   configuring, by the electronic device, the at least one created API to the at least one form field of the plurality of form fields.

2. The method as claimed in claim 1, wherein determining, by the electronic device, the second attribute corresponding to the at least one dependent form field by applying the at least one API configured to the at least one form field based on the user inputted first attribute received in the at least one form field comprises:
   invoking, by the electronic device, the at least one API configured to the at least one form field;
   executing, by the electronic device, the at least one API configured to the at least one form field based on the user inputted first attribute received in the at least one form field; and
   determining, by the electronic device, the second attribute corresponding to the at least one dependent form field based on the execution of the at least one API.

3. The method as claimed in claim 1, further comprising:
   storing, by the electronic device, the at least one created API comprising the plurality of building blocks associated with the at least one API in a specific format in a memory of the electronic device.

4. The method as claimed in claim 1, wherein the plurality of building blocks associated with the at least one API comprises a request type of the at least one API, a type of the at least one API, an area of operation of the at least one API, an API response key and information related to at least one API source.

5. An electronic device for graphically configuring at least one application program interface (API) on form field to retrieve desired output from user interface (UI), wherein the electronic device comprises:
   a memory;
   a processor coupled to the memory;
   a communicator coupled to the memory and the processor; and
   an API management controller (180) communicatively coupled to the memory and the processor, wherein the API management controller is configured to:
   display the UI comprising a plurality of form fields to enable a user to configure at least one API on the plurality of form fields at the UI, the plurality of form fields being fields through which information is respectively provided as attributes on a form;
   configure the at least one API to the at least one form field of the plurality of form fields by inputting a plurality of building blocks using a graphical configuration field, the at least one API being executable according to the configuring to automatically fetch and input a second attribute to a dependent form field based on a user inputted first attribute to the at least one form field;

map the at least one form field to at least one dependent form field of plurality of dependent form fields based on the configured at least one API;

receive a user input of a first attribute to the at least one form field;

determine the second attribute corresponding to the at least one dependent form field of the plurality of dependent form fields by applying the at least one API configured to the at least one form field based on the user inputted first attribute received in the at least one form field;

automatically fill the at least one dependent form field based on the determined second attribute corresponding to the at least one dependent form field; and display the at least one filled dependent form field, wherein the API management controller is configured to configure the at least one API to at least one form field of the plurality of form fields by:

enabling an API configuration option of the at least one form field to which the at least one API is configured;

receiving user inputs of the plurality of building blocks associated with the at least one API to be configured to the at least one form field;

creating the at least one API based on the plurality of building blocks associated with the at least one API; and configuring the at least one created API to the at least one form field of the plurality of form fields.

6. The electronic device as claimed in claim 5, wherein the API management controller is configured to determine the second attribute corresponding to the at least one dependent form field by:

invoking the at least one API configured to the at least one form field;

executing the at least one API configured to the at least one form field based on the user inputted first attribute received in the at least one form field; and determining the second attribute corresponding to the at least one dependent form field based on the execution of the at least one API.

7. The electronic device as claimed in claim 5, wherein the API management controller is further configured to:

store the at least one created API comprising the plurality of building blocks associated with the API in a specific format in a memory of the electronic device.

8. The electronic device as claimed in claim 5, wherein the plurality of building blocks associated with the at least one API comprises a request type of the at least one API, a type of the at least one API, an area of operation of the at least one API, at least one API response key and information related to at least one API source.

* * * * *